(12) United States Patent
Cavelius et al.

(10) Patent No.: US 11,834,269 B2
(45) Date of Patent: Dec. 5, 2023

(54) STACKING STORAGE ARRANGEMENT AND METHOD FOR OPERATING A STACKING STORAGE ARRANGEMENT

(71) Applicant: Jungheinrich Aktiengesellschaft, Hamburg (DE)

(72) Inventors: Jörg Cavelius, Bad Vilbel (DE); Michael Becker, Hainburg (DE); Markus Liebhaber, Oberursel (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 514 days.

(21) Appl. No.: 17/027,427

(22) Filed: Sep. 21, 2020

(65) Prior Publication Data

US 2021/0122570 A1   Apr. 29, 2021

(30) Foreign Application Priority Data

Oct. 25, 2019   (EP) .................................... 19205235

(51) Int. Cl.
*B65G 1/04*     (2006.01)
*B65G 65/00*    (2006.01)
*G06Q 50/28*    (2012.01)

(52) U.S. Cl.
CPC ......... *B65G 1/0471* (2013.01); *B65G 1/0492* (2013.01); *B65G 65/005* (2013.01); *G06Q 50/28* (2013.01)

(58) Field of Classification Search
CPC .. B65G 1/0471; B65G 1/0492; B65G 65/005; B65G 1/0478; B65G 1/0485; B65G 57/302; G06Q 50/28

See application file for complete search history.

(56) References Cited

U.S. PATENT DOCUMENTS

| 3,964,619 | A  | * | 6/1976  | Irmler  | B65G 1/10 |
|           |    |   |         |         | 221/124 |
| 5,147,176 | A  | * | 9/1992  | Stolzer | B65G 1/0471 |
|           |    |   |         |         | 700/218 |
| 5,156,514 | A  |   | 10/1992 | Zah     | |
| 9,505,556 | B2 | * | 11/2016 | Razumov | B65G 1/0492 |
| 10,112,774| B2 |   | 10/2018 | Arnold et al. | |

(Continued)

FOREIGN PATENT DOCUMENTS

| CN | 107203825 A | * | 9/2017 | ........... G05D 1/0217 |
| CN | 110 065 751 A |  | 7/2019 | |

(Continued)

OTHER PUBLICATIONS

European Patent Office issued in European Patent Office (EPO) Patent Application No. 19205235.5, dated Apr. 17, 2020.

*Primary Examiner* — Thomas Randazzo

(74) *Attorney, Agent, or Firm* — GREENBLUM & BERNSTEIN, P.L.C.

(57) ABSTRACT

A stacking storage arrangement having multiple container receiving spaces that are arranged in multiple rows and columns, wherein a loading space in which loading vehicles can be moved is arranged below the container receiving spaces. The operation of a stacking storage arrangement of this type is configured to be economical. For this purpose, each row is assigned a separate loading vehicle stopping position that is arranged outside of the container receiving spaces.

13 Claims, 6 Drawing Sheets

(56) References Cited

U.S. PATENT DOCUMENTS

| | | | |
|---|---|---|---|
| 10,351,346 B2* | 7/2019 | Otto | B65G 1/1378 |
| 11,208,266 B2* | 12/2021 | Kakinuki | B65G 1/0407 |
| 11,535,452 B2* | 12/2022 | Stevens | G05D 1/0297 |
| 2017/0217684 A1* | 8/2017 | Swoboda | B65G 59/063 |
| 2019/0375589 A1 | 12/2019 | Gravelle et al. | |
| 2019/0375590 A1* | 12/2019 | Gravelle | B65G 1/04 |
| 2022/0144546 A1* | 5/2022 | Tendo | G05D 1/02 |

FOREIGN PATENT DOCUMENTS

| | | | | |
|---|---|---|---|---|
| DE | 195 40 855 A1 | 5/1997 | | |
| DE | 10 2012 020899 A1 | 4/2014 | | |
| DE | 10 2013 009340 A1 | 12/2014 | | |
| EP | 0 458 021 A1 | 11/1991 | | |
| JP | S60 71402 A | 4/1985 | | |
| JP | 6-592711 B1 | 10/2019 | | |
| JP | 6981876 B2 * | 12/2021 | | B65G 1/04 |
| WO | 2016026910 A1 | 2/2016 | | |
| WO | WO-2020006010 A1 * | 1/2020 | | B65G 1/0407 |

\* cited by examiner

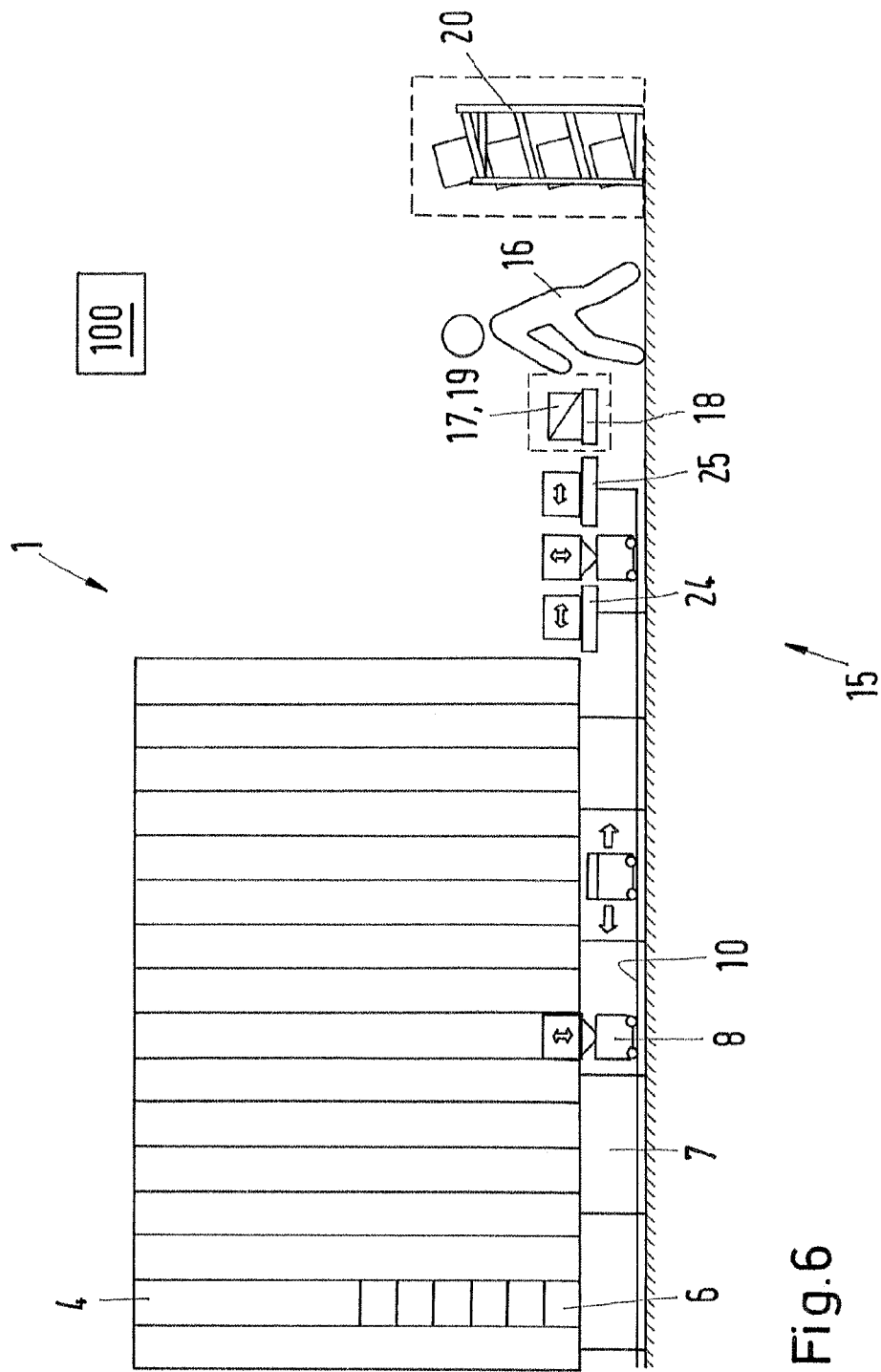

STACKING STORAGE ARRANGEMENT AND METHOD FOR OPERATING A STACKING STORAGE ARRANGEMENT

CROSS-REFERENCE TO RELATED APPLICATIONS

The present application claims priority under 35 U.S.C. § 119 of European Patent Application No. EP 19205235.5, filed Oct. 25, 2019, the disclosure of which is expressly incorporated by reference herein in its entirety.

BACKGROUND

1. Field of the Invention

The present invention relates to a stacking storage arrangement having multiple container receiving spaces which are arranged in multiple rows and columns, wherein a loading space in which loading vehicles can be moved is arranged below the container receiving spaces.

The invention furthermore relates to a method for operating a stacking storage arrangement having multiple container receiving spaces which are arranged in rows and columns, wherein containers are introduced into the container receiving spaces from below with the aid of loading vehicles and containers are removed from the container receiving spaces at the bottom with the aid of loading vehicles.

2. Discussion of Background Information

A stacking storage arrangement enables the storage of a plurality of containers in relatively tight space. The containers are respectively arranged in stacks. One container receiving space each is provided to accommodate a stack of containers of this type. The container receiving spaces are arranged one after another in rows or "alleys." Multiple rows or alleys of this type are arranged next to one another so that a matrix-like arrangement of the container receiving spaces results.

If the container receiving spaces are loaded from below and the containers are also removed from the container receiving spaces again at the bottom, then a loading vehicle used for this purpose can be moved on the flooring or another driving surface that are arranged below the container receiving spaces. This has the advantage that the stacking storage arrangement does not also need to additionally accommodate the weight of one or more loading vehicles. The constructional cost for a stacking storage arrangement of this type can thus be kept low.

SUMMARY

The operation of the stacking storage arrangement of the invention is configured to be economical.

This is achieved in that a separate loading vehicle stopping position is assigned to each row, which stopping position is arranged outside of the container receiving spaces.

Thus, the stacking storage arrangement is in principle divided into a row of stacking storage sub-arrangements, wherein each stacking storage sub-arrangement comprises a single row of container receiving spaces. These container receiving spaces are then supplied from a separate loading vehicle stopping position, which keeps the cost for controlling the loading vehicles low. The loading vehicles only need to be able to move in the respectively assigned row and introduce containers into the container receiving spaces from the loading vehicle stopping position, or remove containers from the container receiving spaces and transport them into the loading vehicle stopping position. In the loading vehicle stopping position, the containers can then be filled with articles being placed into storage, or the articles that were placed into storage can be removed from the respective container in this position. The term "stopping position" has been chosen here for the sake of simplicity. It is not absolutely necessary that the loading vehicle actually stop in the stopping position. The stopping position can also be formed by a region in which the containers can be filled or (partially) emptied during a movement of the loading vehicle, or "on the fly" for short.

Preferably, each loading vehicle stopping position is assigned a placement-into-storage/removal-from-storage arrangement, wherein each placement-into-storage/removal-from-storage arrangement has at least one container transfer position for transferring a container from the placement-into-storage/removal-from-storage arrangement to the loading vehicle or vice versa. This creates increased safety for a user or an operator. Before the user can reach into the container to remove a product or an article being placed into storage in general, or to place the product into the container, the container is removed from the loading vehicle. Only when it is no longer necessary for an operator to reach in is the container picked up by the loading vehicle or driven into the placement-into-storage/removal-from-storage arrangement by the loading vehicle.

It is also preferred that the container transfer position comprises a tray beneath which an entry surface for the loading vehicle is arranged. The loading vehicle can drive onto the entry surface and then place the container on the tray. For this purpose, the loading vehicle can comprise a height-adjustable container seat, for example. If the container seat is lowered, then the container can be transferred to the tray.

Preferably, multiple placement-into-storage/removal-from-storage arrangements are assigned a shared transfer element. The transfer element can be embodied as a conveyor belt, for example. If necessary, a container can then be brought from a position in front of one row of the stacking storage arrangement into a position in front of another row of the stacking storage arrangement so that the container can be selectively brought into different rows of the stacking storage arrangement The control thereby becomes only negligibly more complex, since the actual placement-into-storage and removal-from-storage procedure can still be handled separately for each row, and a movement perpendicular to the rows is only required if the need arises.

Preferably, at least one placement-into-storage/removal-from-storage arrangement has a placement-into-storage position and a removal-from-storage position. A container that is to be introduced into the stacking storage arrangement can be made available in the placement-into-storage position. A container that has been removed from the stacking storage arrangement can be arranged in the removal-from-storage position. The tasks that are necessary for preparing the placement into storage and the tasks that are necessary after the removal from storage can then be decoupled from one another.

Preferably, the placement-into-storage position and the removal-from-storage position are arranged one after another in an extension of the row. The placement-into-storage position and the removal-from-storage position can then be served by a movement of the loading vehicle that follows the direction of the row.

In one embodiment, a control device, or "controller", is provided which specifies a position of a container in the container receiving spaces as a function of a turnover frequency of the container. As stated above, a container is used to accommodate products. In this process, there are products that are needed more frequently than other products. A container that contains the frequently needed products has a higher turnover frequency than a container that contains products needed less often. In many cases, it is known which products are needed frequently. In an advantageous embodiment, however, it can be provided that the control device determines the turnover frequency of a container during operation. This can make it necessary to restack the containers over time, that is, to change the position thereof. Such a change of positions can occur without significant effort during operation.

Preferably, the control device specifies the position of a container having a high turnover frequency in a lower region of a container receiving space. Because the loading and removal for a container receiving space take place from below, fewer steps are then required in order to access the container having the higher turnover frequency. This saves time and thus increases the economic efficiency during operation of the stacking storage arrangement.

It can also be provided that the control device specifies the position of a container having a high turnover frequency in a column that is closer to the loading vehicle stopping position than the position of a container having low turnover frequency. Accordingly, the loading vehicle must travel a shorter path if it is to reach a container having a high turnover frequency.

Preferably, the control device controls the transfer element as a function of the turnover frequency of the container and assigns the container a row depending on the turnover frequency. It can thus be achieved that all containers having a high turnover frequency can be arranged in a lower region of the container receiving spaces and in a column close to the loading vehicle stopping position.

With a method of the type described above, a benefit of the invention is achieved in that each row of container receiving spaces is assigned a region in an extension of the row, in which region a container can be made available for placement into storage or following removal from storage.

This results in the advantages indicated above. Each row is assigned a region of this type, for example the loading vehicle stopping position, which can be reached by a loading vehicle that can be moved linearly in a direction that is defined by the row. In this manner, the loading of individual rows can be decoupled from one another so that the associated control can be kept very simple.

Preferably, containers are moved from one region into another region outside of the rows. A change of rows is thus also possible, should this become necessary.

It is also advantageous if containers having a high turnover frequency are arranged in a lower region of the container receiving spaces. In this case, only a few restacking operations are needed if a container is to be reached.

It is also advantageous if containers having a high turnover frequency are arranged closer to the region in an extension of the rows than containers having a low turnover frequency. The containers with the higher turnover frequency are thus arranged "in front," whereas the containers having a low turnover frequency are arranged "in back." The trip times of the loading vehicles are thus kept short.

Preferably, the turnover frequency of containers is determined dynamically during operation. Knowledge of the turnover frequency from the outset is thus not necessary. Instead, the system is self-learning.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6 shows a schematic illustration of the stacking storage arrangement from FIG. 5 from the side.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
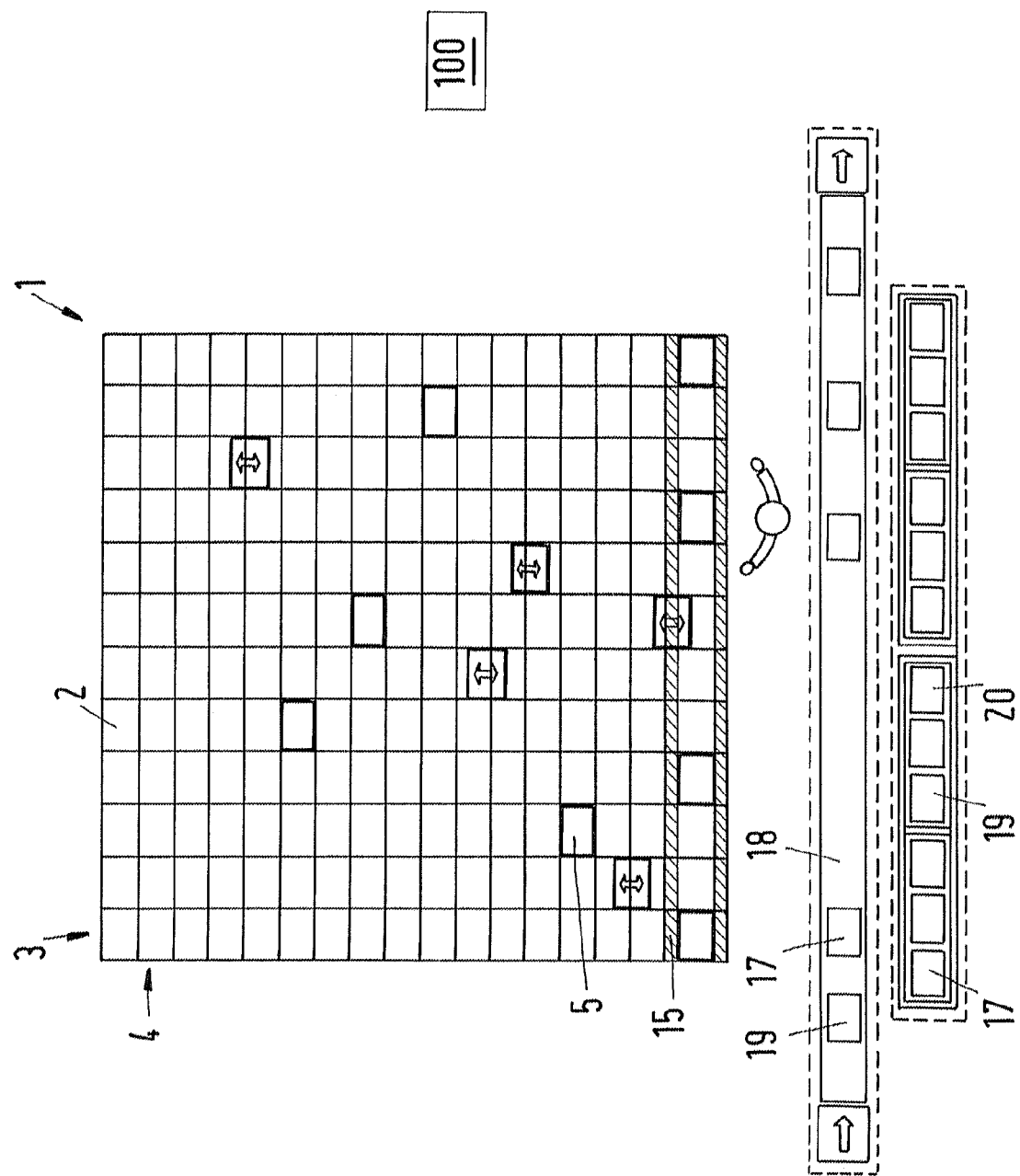
FIG. 1 shows a schematic illustration of a stacking storage arrangement in a top view.

FIG. 1 schematically shows a stacking storage arrangement 1 having multiple container receiving spaces 2 that are arranged in multiple rows 3 and multiple columns 4. Thus, in a top view, the container receiving spaces 2 are arranged in the form of a matrix with rows 3 and columns 4, wherein each container receiving space 2 is located at the intersection of a row 3 with a column 4.

Figure 2:
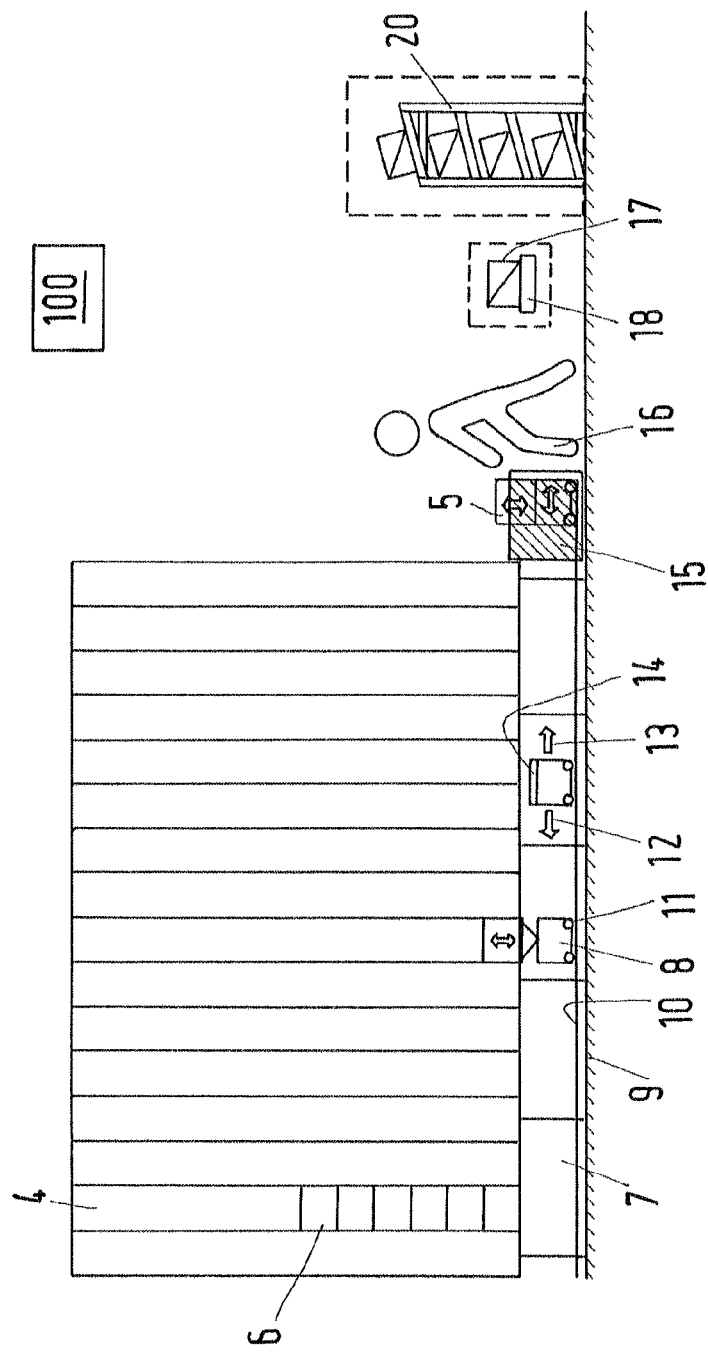
FIG. 2 shows a schematic view of the stacking storage arrangement from FIG. 1 from the side.

In each container receiving space 2, multiple containers 5 can be arranged on top of one another, namely in the form of a stack 6, as is illustrated in FIG. 2.

Below the container receiving spaces 2, a loading space 7 in which one or more loading vehicles 8 can be moved is arranged. The loading vehicles 8 can thereby be moved on a flooring 9 or, as illustrated, on a track 10 that is arranged on the flooring 9 or at a distance from the flooring 9. The track 10 can be embodied as a continuous surface. However, it can also be embodied as a rail arrangement on which wheels 11 of the loading vehicle 8 can roll.

The loading vehicle 8 can be moved in opposing directions, as is illustrated by arrows 12, 13. However, the loading vehicle 8 can only be moved in the direction of a row 3. The loading vehicle 8 can therefore be moved solely beneath container receiving spaces 2 of a row 3.

Within the row 3, the loading vehicle 8 can transport a container 5 from one column 4 to another column 4 in order to relocate a container 5.

However, a main purpose of the loading vehicle 8 is to introduce a container 5 into the stacking storage arrangement or to remove a container 5 from the stacking storage arrangement.

For the introduction, the loading vehicle 8 transports the container 5 in a position beneath a container receiving space 2 and lifts the container 5. When the container 5 comes into contact with the stack 6, the stack 6 is lifted in tandem and the container 5 is lifted further with the stack 6 until it has passed a holding device with which the bottom container 5 is held at the necessary distance above the track 10.

For the removal of a container 5 from the stacking storage arrangement, the loading vehicle 8 is once again driven beneath the container receiving space 2, and a container seat 14 of the loading vehicle 8 is lifted until it comes into contact with the bottom container 5 of a stack 6. The container 5 is lifted with the stack 6. The holding device can then be released. The container 5 is lowered with the stack 6. The holding device (not illustrated) thereby engages, up to this point, with the second-from-the-bottom container of a stack 6, so that the remaining stack is held in the container receiving space 2. The container 5 being removed can then be driven out of the stacking storage arrangement with the loading vehicle 8.

The loading vehicle 8 is then driven into a loading vehicle stopping position 15 that is arranged outside of the container receiving spaces 2. Here, a separate loading vehicle stopping position is assigned to each row 3.

A control device 100, which can be connected to the loading vehicle 8 in a wireless manner or even via wires, controls the loading vehicle 8 such that it can perform the necessary tasks, that is, the placement into storage, removal from storage, or relocation of containers 5 in the respective row 3. Because the movement of the loading vehicle 8 is limited to a single row 3, the control device 100 can work with relatively simple algorithms.

An operator 16 has access to the container 5 when the loading vehicle 8 is located in the loading vehicle stopping position 15. The operator 16 can then remove a product from the container 5 and place it in an order container 17. The order container 17 is used, for example, to consolidate multiple different products that belong to an order so that they can later be shipped together. The order container 17 is arranged on a transfer element 18 that is arranged preferably parallel to the columns 4 of the stacking storage arrangement 1.

It is also possible to arrange source containers 19 on the transfer element 18, from which source containers 19 products can be removed which are to be transferred into the container 5 and are subsequently to be placed into storage in the stacking storage arrangement 1.

A further transfer element, which is not illustrated, can be used to transport a container 5 from one row 3 to another row 3.

Order containers 17 and source containers 19 can also be arranged in one or more shelves 20 that can be provided in addition to or in place of the transfer element 18.

As stated above, the loading vehicle 8 comprises a container seat 14 that can be lifted or lowered. It is thus possible to lift the container 5 in the loading vehicle stopping position 15 such that, at this location, the operator 16 has ergonomic access to the product located in the container 5.

In the embodiment according to FIGS. 1 and 2, the loading vehicle 8, which has transported the container 5 into the loading vehicle stopping position 15 from the container receiving space, is tied up for as long as the operator 16 requires access to the container 5.

Figure 3:
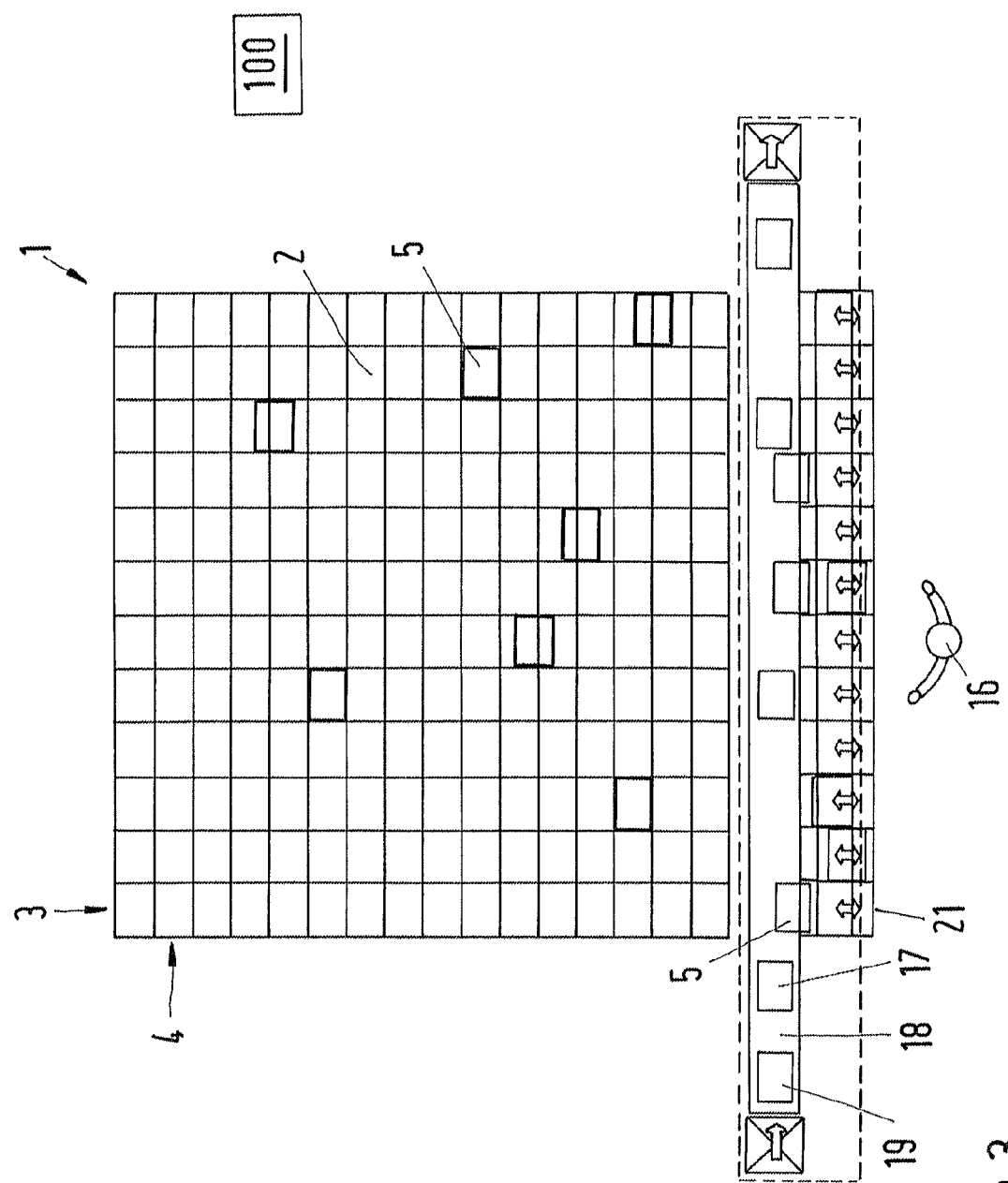
FIG. 3 shows a schematic view of a second embodiment of a stacking storage arrangement in a top view.
Figure 4:
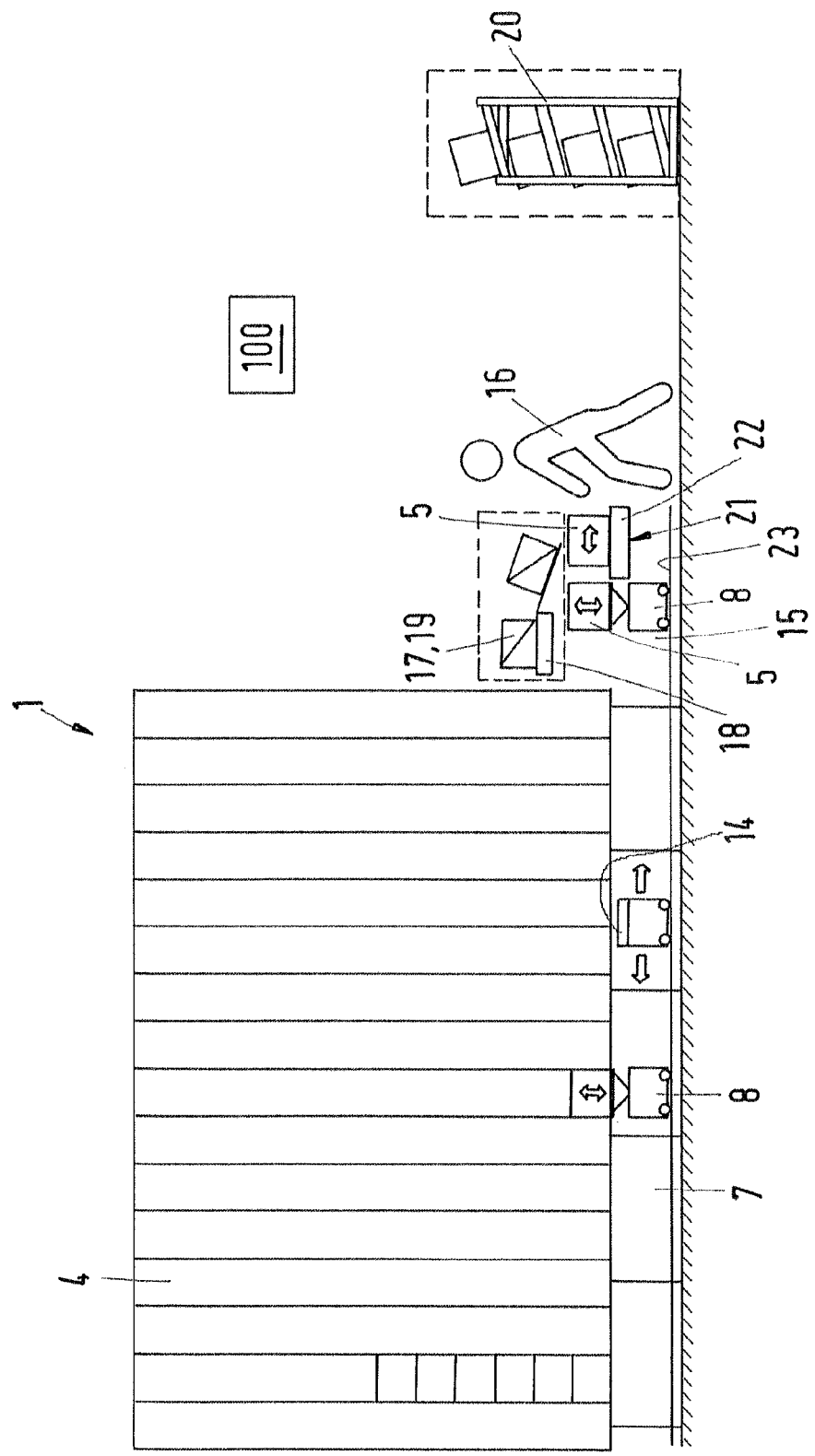
FIG. 4 shows a schematic view of the stacking storage arrangement from FIG. 3 from the side.

Therefore, as illustrated in FIGS. 3 and 4, each loading vehicle stopping position 15 can be assigned a placement-into-storage/removal-from-storage arrangement 21 in which a container 5 can be transferred from the loading vehicle 8 onto a placement-into-storage/removal-from-storage riser 22 and vice versa. For this purpose, the container 5 is lifted by the loading vehicle 8 until it is located at a height above the placement-into-storage/removal-from-storage riser 22. The loading vehicle 8 can be moved under the placement-into-storage/removal-from-storage riser 22. If the container seat 14 of the loading vehicle 8 is lowered, the container 5 is placed on the placement-into-storage/removal-from-storage riser 22. The operator 16 then has access to the container 5 without the loading vehicle 8 having to remain in the loading vehicle stopping position 15 during the time of access. The loading vehicle 8 can be then be used to restack containers 5 between columns 4 of the stacking storage arrangement.

The placement-into-storage/removal-from-storage riser 22 forms a tray beneath which an entry surface 23 for the loading vehicle 8 is arranged.

Also provided in the embodiment according to FIGS. 3 and 4 is a transfer element 18 on which order containers and source containers 19 can be moved from one placement-into-storage/removal-from-storage position to another. Containers 5 can also be transported back and forth between individual rows 3 on the transfer element 18, if this is necessary.

The transport of a container 5 from the placement-into-storage/removal-from-storage riser 22 onto the transfer element 18 must then be carried out by the operator 16, who receives relevant information or signals from the control device 100 when necessary. In a manner not illustrated in greater detail, means can also be provided with which a container 5 can be transferred from the placement-into-storage/removal-from-storage riser 22 to the transfer element 18.

Figure 5:
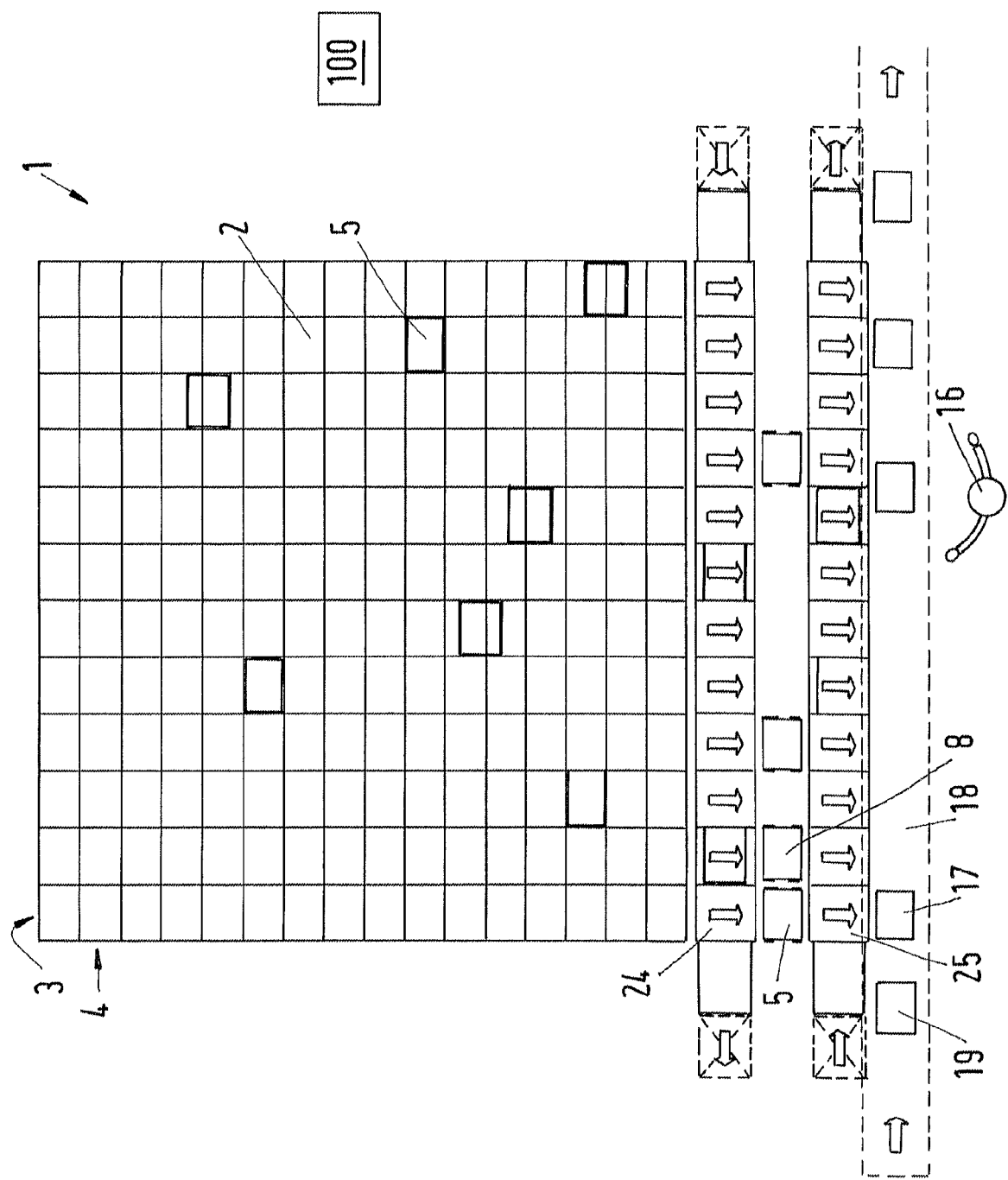
FIG. 5 shows a schematic view of a third embodiment of a stacking storage arrangement in a top view.

FIGS. 5 and 6 show a further development of the embodiment according to FIGS. 3 and 4.

In the embodiment according to FIGS. 5 and 6, the placement-into-storage/removal-from-storage arrangement is divided into a placement-into-storage arrangement 24 and a removal-from-storage arrangement 25. Here, each row 3 is once again assigned a separate placement-into-storage arrangement 24 and a separate removal-from-storage arrangement 25. The placement-into-storage arrangement 24 and the removal-from-storage arrangement 25 are arranged one after another in an extension of the row 3. They can, as is illustrated in FIG. 5, be arranged at a distance from one another or, as is not illustrated in the drawing, can be arranged close to one another. It is also possible to arrange the two arrangements 24, 25 at opposite ends of the rows 3.

The control device 100 controls the operation of the loading vehicles 8 in each row. Here, the control device 100 specifies a position of a container 5 in the container receiving spaces 2 as a function of a turnover frequency of the respective container 5.

This will be explained using the example of a stacking storage arrangement 1 in which a plurality of products is kept in stock that are to be brought to shipment by a mail-order business, for example.

In this process, there are products which are more frequently in demand than other products. Accordingly, a container 5 that contains a product more frequently in demand must be removed from the stacking storage arrangement 1 more often than a container 5 in which products that are less frequently in demand are stored.

The control device 100 then controls the position of the respective container 5 such that the container 5 having a high turnover frequency is arranged in a lower region of the container receiving space 2. Thus, if a container 5 of this type must be removed from the stacking storage arrangement, then only a few restacking operations are necessary.

This is readily apparent if the container with the product in demand is arranged in the bottommost position of a stack 6. In this case, the loading vehicle 8 merely needs to pick up the bottommost container 5 and bring it to the removal-from-storage position 25.

If, for example, the corresponding container is arranged in position number 3 from the bottom, then the loading vehicle 8 must initially remove the bottommost container from the stack 6 and stow this container in another container receiving space 2. The loading vehicle 8 must then proceed analogously with the next container. However, this container can also be stowed in another container receiving space 2 of the corresponding row 3. The container 5 in demand is then accessible and can be brought into the removal-from-storage position 25 by the loading vehicle 8. If enough loading vehicles 8 are available in a row 3, these loading vehicles can also be used for the temporary storage of the containers.

The control device 100 can also specify the position of a container having a high turnover frequency in a column 4 that is closer to the loading vehicle stopping position 15 than the position of a container 5 having low turnover frequency. In a case such as this, the loading vehicle does not have to travel such long distances in order to remove the corresponding container 5 from the stacking storage arrangement 1. Expediently, a container 5 frequently in demand is both positioned in a lower region of a container receiving space 2 and this region is also arranged close to the loading vehicle stopping position 15.

In many cases, the turnover frequency of a container 5 is known, for example because it is known which products are frequently in demand.

However, the stacking storage arrangement can also be embodied to be self-learning. In this case, the control device 100 determines the turnover frequency of containers 5 dynamically during operation. This means that, during a commissioning of the stacking storage arrangement, there is only a random distribution of the containers 5 in the rows 3, columns 4 and stacks 6. However, the random distribution will change over time once the control device 100 has learned which containers 5 are needed more often.

The foregoing examples have been provided merely for the purpose of explanation and are in no way to be construed as limiting of the present invention. While the present invention has been described with reference to an exemplary embodiment, it is to be understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement comprising:
a structure defining multiple container receiving spaces arranged in multiple rows and columns and a loading space;
at least one loading vehicle configured to be movable into the loading space below the container receiving spaces;
each row is assigned a separate loading vehicle stopping position that is arranged outside of the container receiving spaces;
wherein multiple placement-into-storage/removal-from-storage arrangements are assigned a shared transfer element;
wherein the placement-into-storage/removal-from-storage arrangements are arranged one after another in an extension of the row; and
wherein the placement-into-storage/removal-from-storage arrangements is configured to form a tray beneath which an entry surface for the loading vehicle is arranged, and wherein the loading vehicle is configured to drive onto the entry surface and then place the container on the tray.

2. A stacking storage arrangement comprising:
a structure defining multiple container receiving spaces arranged in multiple rows and columns and a loading space;
at least one loading vehicle configured to be movable into the loading space below the container receiving spaces;
each row is assigned a separate loading vehicle stopping position that is arranged outside of the container receiving spaces;
each loading vehicle stopping position is assigned a placement-into-storage/removal-from-storage arrangement;
each placement-into-storage/removal-from-storage arrangement has at least one container transfer position for transferring a container from the placement-into-storage/removal-from-storage arrangement to the loading vehicle or vice versa; and
wherein the container transfer position is configured to form a tray beneath which an entry surface for the loading vehicle is arranged, and wherein the loading vehicle is configured to drive onto the entry surface and then place the container can the tray.

3. The stacking storage arrangement according to claim 2, therein multiple placement-into-storage/removal-from-storage arrangements are assigned a shared transfer element.

4. The stacking storage arrangement according to claim 2, wherein at least one placement-into-storage/removal-from-storage arrangement has a placement-into-storage position and a removal-from-storage position.

5. The stacking storage arrangement according to claim 2, further comprising a controller configured to specify a position of a container in the container receiving spaces as a function of a turnover frequency of the container.

6. The stacking storage arrangement according to claim 5, wherein the controller is configured to specify a position of a container having a high turnover frequency in a lower region of a container receiving space.

7. The stacking storage arrangement according to claim 5, wherein the controller is configured to specify a position of a container having a high turnover frequency in a column that is closer to the stopping position than a position of a container having low turnover frequency.

8. The stacking storage arrangement according to claim 5, wherein the controller is configured to control a transfer element as a function of the turnover frequency of the container and assigns the container a row depending on the turnover frequency.

9. A method for operating a stacking storage arrangement having multiple container receiving spaces that are arranged in rows and columns, said method comprising:
- assigning each row of container receiving spaces a region in an extension of the row, in which region a container can be made available for placement into storage or following removal from storage;
- introducing containers, aided by loading vehicles, into the container receiving spaces from a bottom of the stacking storage arrangement;
- removing containers, aided by loading vehicles, from the container receiving spaces from the bottom of the stacking storage arrangement;
- assigning each loading vehicle stopping position a placement-into-storage/removal-from-storage arrangement; and
- providing each placement-into-storage/removal-from-storage arrangement at least one container transfer position for transferring a container from the placement-into-storage/removal-from-storage arrangement to the loading vehicle or vice versa; and
- wherein the container transfer position is configured to form a tray beneath Which an entry surface for the loading vehicle is arranged, and wherein the loading vehicle is configured to drive onto the entry surface and then place the container on the tray.

10. The method according to claim 9, further comprising moving the containers from one region into another region outside of the rows.

11. The method according to claim 9, further comprising arranging containers having a relatively higher turnover frequency in a lower region of the container receiving spaces.

12. The method according to claim 9, further comprising arranging containers having a relatively higher turnover frequency closer to the region in an extension of the rows than containers having a relatively lower turnover frequency.

13. The method according to claim 9, further comprising determining the turnover frequency of containers dynamically during operation.

* * * * *